(12) United States Patent
Thompson et al.

(10) Patent No.: US 10,919,441 B1
(45) Date of Patent: Feb. 16, 2021

(54) TRAILER MARKER SYSTEM

(71) Applicants: Barrett Thompson, Gulfport, MS (US); David Brown, Wiggins, MS (US)

(72) Inventors: Barrett Thompson, Gulfport, MS (US); David Brown, Wiggins, MS (US)

(*) Notice: Subject to any disclaimer, the term of this patent is extended or adjusted under 35 U.S.C. 154(b) by 0 days.

(21) Appl. No.: 16/601,941

(22) Filed: Oct. 15, 2019

(51) Int. Cl.
*B60Q 1/32* (2006.01)
*B60Q 1/26* (2006.01)

(52) U.S. Cl.
CPC .............. *B60Q 1/32* (2013.01); *B60Q 1/2615* (2013.01); *B60Q 1/2696* (2013.01)

(58) Field of Classification Search
CPC ...... F21S 41/141; F21S 41/143; F21S 41/147; F21S 41/148; F21S 41/18; F21S 41/19; F21S 41/192; F21S 43/14; F21S 43/15; F21S 43/19; F21S 43/195; B62D 63/08; B60Q 1/0035; B60Q 1/2615; B60Q 1/2696; B60Q 1/30; B60Q 1/302; B60Q 1/305; B60Q 1/32; B60Q 1/323; B60Q 1/326; B60Q 1/48–50; F21W 2103/10; F21W 2103/15; F21W 2103/60; F21W 2102/40; F21W 2104/00
See application file for complete search history.

(56) References Cited

U.S. PATENT DOCUMENTS

| | | | |
|---|---|---|---|
| 4,024,497 A | | 5/1977 | Ruppel |
| 5,101,326 A | * | 3/1992 | Roney ................. B60Q 1/2615 362/545 |
| 5,567,036 A | * | 10/1996 | Theobald ................. B60Q 1/32 362/485 |
| 5,775,712 A | * | 7/1998 | Link ........................ B60Q 1/46 280/422 |
| 6,422,728 B1 | * | 7/2002 | Riggin ..................... B60Q 1/16 340/475 |
| 7,048,419 B1 | * | 5/2006 | Rodriguez ............. B60Q 1/305 362/485 |
| 7,588,358 B1 | * | 9/2009 | Condon ............... B60Q 1/2696 362/485 |
| 2007/0171641 A1 | * | 7/2007 | Sassoon ............... G02B 5/0215 362/244 |
| 2009/0051506 A1 | * | 2/2009 | Hicksted ............. H05B 47/235 340/332 |
| 2017/0274712 A1 | * | 9/2017 | Salter .................. B60C 23/0406 |

* cited by examiner

*Primary Examiner* — Matthew J. Peerce
*Assistant Examiner* — Steven Y Horikoshi
(74) *Attorney, Agent, or Firm* — Sanchelima & Associates, P.A.; Christian Sanchelima; Jesus Sanchelima

(57) ABSTRACT

A trailer marker system including side markers and a round marker is disclosed herein. The side markers are to extend along the side of a trailer or trailer vehicle. The side markers are elongated lights, while the round marker is a circular shaped light. The side markers and round marker illuminate the surroundings of a trailer vehicle for increased safety. Importantly, each of the side markers and rear marker include lights that face down towards the roadway. This results in road markings being illuminated as to allow a driver of the trailer vehicles to safely remain on the road. Additionally, the downward facing lights found in the side markers and the rear marker help to eliminate blind spots. Blind spots when making a turn or reversing the trailer are eliminated as they are illuminated in order to allow the driver to be safer when operating the trailer vehicle.

10 Claims, 2 Drawing Sheets

TRAILER MARKER SYSTEM

BACKGROUND OF THE INVENTION

1. Field of the Invention

The present invention relates to a trailer marker system and, more particularly, to a trailer marker system that illuminates the road in order to better see surrounding conditions of a trailer vehicle.

2. Description of the Related Art

Several designs for a trailer marker system have been designed in the past. None of them, however, include means to illuminate the surrounding environment and path of trailers and trailer vehicles. Current trailer markers serve as a safety measure for others to be able to safely see the trailer or trailer vehicles and take appropriate measures to avoid collisions therewith. That is to say that the trailer markers are meant as safety measures for surrounding vehicle users. Hence, there is a need for a trailer marker system that additionally provides safety measures for the driver of a trailer. The trailer marker system illuminates the surrounding roadway for the driver of the trailer to be able to better see roadways and roadway markings. Additionally, areas of the trailer that were previously obscure and blind spots due to poor lighting are better illuminated to further increase the safety of the trailer driver. This aids a trailer driver to more safely reverse the vehicle, make turns or the like on poorly lit roadways and avoid road accidents.

Applicant believes that a related reference corresponds to U.S. Pat. No. 4,024,497A issued to Raymond A. Ruppel et al. for Trailer Protector Light System. However, it differs from the present invention because the Raymond reference involves additional lights to be paired with the already existing marker lights of a vehicle. The present invention includes marker lights that illuminate in ways that improve the safety of trailer operators as well as that of the drivers in surrounding vehicles. The present invention illuminates roadways in order to be able to better illuminate blind spots when reversing a trailer or making a turn with the trailer and to further illuminate road markings.

Other documents describing the closest subject matter provide for a number of more or less complicated features that fail to solve the problem in an efficient and economical way. None of these patents suggest the novel features of the present invention.

SUMMARY OF THE INVENTION

It is one of the objects of the present invention to provide a trailer marker system that increases the safety of the driver of a trailer or trailer vehicle.

It is another object of this invention to provide a trailer marker system that eliminates blind spots.

It is still another object of the present invention to provide a trailer marker system that illuminates road markings.

It is yet another object of this invention to provide such a device that is inexpensive to implement and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE EMBODIMENTS OF THE INVENTION

Figure 1:
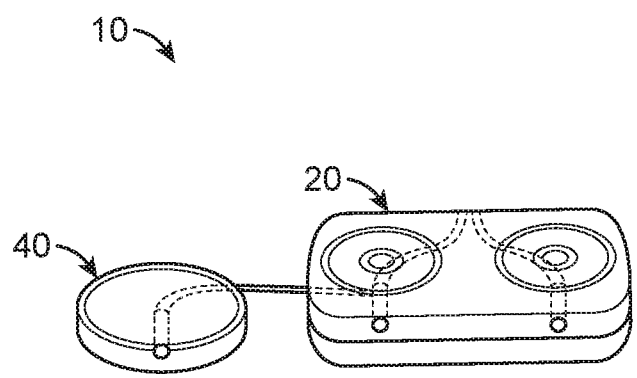
FIG. 1 represents an isometric view of the present invention.

Referring now to the drawings, where the present invention, a trailer marker system is generally referred to with numeral 10, it can be observed that it basically includes side markers 20 with side marker floor lights 22 and a round marker 40 with a round marker floor light 42.

It can be seen in FIG. 1 that the trailer marker system 10 is a plurality of lights which may be interconnected to one another. There is plurality of side markers 20 that connect to one another through the means of a wire 60. Side markers 20 are preferably mounted to the side a trailer 100 or trailer vehicle. Side markers 20 may be removably attached or fixedly attached to trailer 100 or trailer vehicle as per the preferences of a user. The attaching means suitable may be an adhesive, hook and loop straps, fasteners, snap buttons, screws, nails or the like. Side markers 20 are preferably amber colored as per safety guidelines, but any other color may be suitable. The amount of side markers 20 may vary as per the needs of a user. A user may have to use more side markers 20 if trailer 100 is beyond certain dimensions as per regulatory safety requirements. Alternatively, a user may only have one of side markers 20. It is preferable that side markers 20 are elongated and rectangular shaped. However, any other shapes may be suitable. It should be understood that a certain shape of side markers 20 may be needed as per regulations of driving trailers and trailer vehicles. Wire 60 additionally connects one of side markers 20 located at a distal end to round marker 40. Wire 60 may also be used to power the lights found inside of all connected sides makers 20 and round marker 40. Additionally, seen in FIG. 1, is round marker 40. Round marker 40 is preferably mounted as the last side marker light of trailer 100 of trailer vehicle. In an alternate configuration round marker 40 may be mount to the rear of trailer 100 or trailer vehicle. Round marker 40 may be removably attached or fixedly attached to trailer 100 or trailer vehicle as per the preferences of a user. The attaching means suitable may be an adhesive, hook and loop straps, fasteners, snap buttons, screws, nails or the like. Round marker 40 are preferably red as per safety guidelines, but any other color may be suitable as well. Round marker 40 may preferably be circular in shape as per regulations, but it should be understood that any other shape may be suitable for round marker 40. For increased safety, each of side markers 20 and round marker 40 includes a light, preferably an LED light, aimed at the ground below to help illuminate the road and road markings in order to increase the safety of truck drivers. Drivers can better see the roadways and blind spots as to avoid any sort of accident or mishap while driving. These lights found on the markers which are aimed at the ground are better defined as side marker floor lights 22 and round marker floor light 42. Preferably, side marker floor lights 22 and round marker floor light 42 are LED lights.

Figure 2:
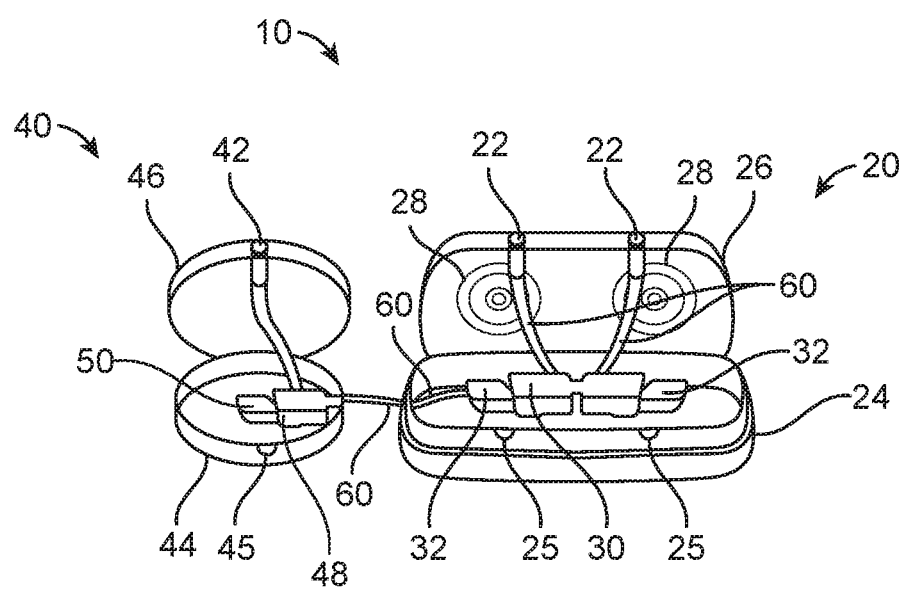
FIG. 2 shows the internal components of the present invention.

Referring to FIG. 2, each of side markers 20 further include a housing 24, a cover 26, bulb socket 30 and light bulbs 32. Side markers 20 may be rectangular shaped and elongated as to allow more lights to be held for illumination. Housing 24 holds bulb socket 30. Bulb socket 30 may preferably be rectangular shaped and configured to receive one of light bulbs 32 on each end. Bulb socket 30 may be fixedly or removably mounted to housing 24 through the use of fastening means such as screws, fasteners, an adhesive or the like as known in the art of fastening means. It should be understood that any number of light bulbs 32 and side marker floor lights 22 may be suitable. Housing 24 may also include side marker floor light cutouts 25, which is adapted to support side marker floor lights 22 in place when side markers 20 are assembled. The number of side marker floor light cutouts 25 corresponds with the number of side marker floor lights 22. The use of more light bulbs 32 and side marker floor lights 22 simply results in more light being emitted thereby resulting in greater illumination. Preferably, the number of side marker floor lights 22 corresponds with the number of light bulbs 32. Housing 24 is then roofed by cover 26. Cover 26 is preferably colored yet still transparent enough to allow light being emitted from side markers 20 to be visible. In an alternate embodiment, cover 26 may be entirely transparent with no color. Cover 26 may preferably be made of plastic, but other materials such as glass may be suitable. Cover 26 is to protect the internal components of side markers 20 from weather conditions such as rain and debris as to keep lights bulbs 32 functioning and intact. Cover 26 further includes circular portions 28. Circular portions 28 are to indicate where bulbs can be found underneath of cover 26. In the present embodiment there are two of circular portions 28 as side markers 20 preferably house two of light bulbs 32. Cover 26 may be mounted to housing 24 by fastening means as known in the art. Mounted on one side, more specifically the bottom side of cover 26 may be mounted side marker floor lights 22. The amount of side marker floor lights 22 may correspond with the number of light bulbs 32 found in each of side markers 20. Importantly, side marker floor lights 22 increase the safety of drivers of trucks, trailers and trailer vehicles by illuminating the roadway and the road way markings in order to allow drivers to avoid collisions and blind spots. The light emitted by side marker floor lights 22 are preferably white, but other colored lights may be suitable.

Still referring to FIG. 2, it can be seen that round marker 40 further includes a round marker housing 44, round marker cover 46, round marker bulb socket 48 and round marker bulb 50. Round marker 40 is smaller than side markers 20 as it is to house and hold less lights. Additionally, there may be more than one of round marker 40, but preferably there is only one of round marker 40. Round marker housing 44 holds round marker bulb socket 48. Round marker bulb socket 48 may preferably be circular or round shaped and configured to receive one of round marker bulb 50. Round marker bulb socket 48 may be fixedly or removably mounted to round marker housing 44 through the use of fastening means such as screws, fasteners, an adhesive or the like as known in the art of fastening means. Round marker housing 44 may also include a round marker floor light cutout 45, which is adapted to support round marker floor lights 42 in place when round markers 40 are assembled. The number of round marker floor light cutout 45 corresponds with the number of round marker floor lights 44. It should be understood that any number of round marker light bulb 50 and round marker floor lights 42 may be suitable. Preferably, the number of round marker floor light 42 corresponds with the number of round marker light bulb 50. The use of more round marker light bulbs 50 and round marker floor lights 42 simply results in more light being emitted thereby resulting in greater illumination. Round marker housing 44 is then roofed by round marker cover 46. Round marker cover 46 is preferably colored yet still transparent enough to allow light being emitted from round marker 40 to be visible. In an alternate embodiment, round marker cover 46 may be entirely transparent with no color. Round marker cover 46 may preferably be made of plastic, but other materials such as glass may be suitable. Round marker cover 46 is to protect the internal components of round marker 40 from weather conditions such as rain and debris as to keep round marker lights bulb 50 functioning and intact. Round marker cover 46 may be mounted to round marker housing 44 by fastening means as known in the art. Mounted on one side, more specifically the bottom side of round marker cover 46 may be mounted round marker floor light 42. In the present invention, round marker 40 may include one of round marker light bulb 50 and round marker floor light 42. However, it should be understood that any other number of round marker floor light 42 and round marker light bulb 50 may be suitable as well. Importantly, round marker floor light 42 increases the safety of drivers of trucks, trailers and trailer vehicles by illuminating the roadway and the road way markings in order to allow drivers to avoid collisions and blind spots. The light emitted by round marker floor light 42 are preferably white, but other colored lights may be suitable.

Figure 3:
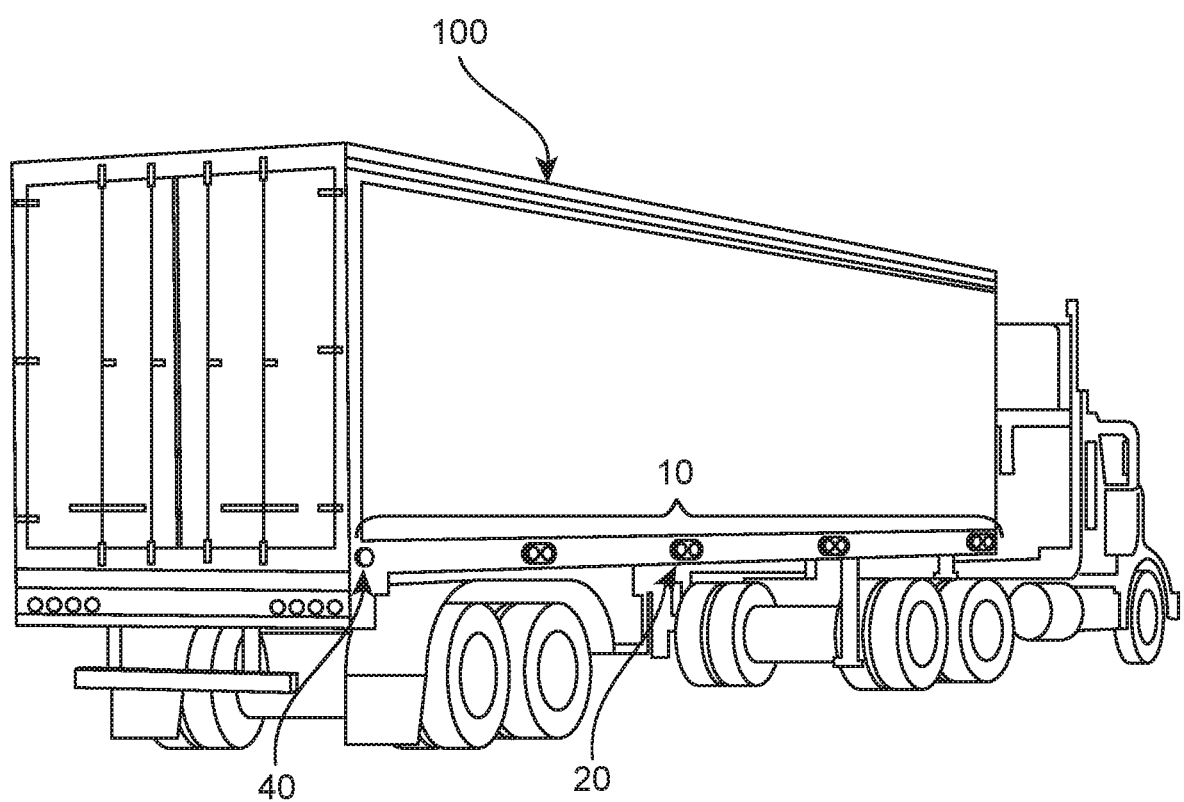
FIG. 3 illustrates the present invention mounted to a vehicle trailer thereon.

Referring to FIG. 3, it can be seen how trailer marker system 10 is mounted to trailer 100, trailer vehicle, truck or the like. It should be understood that trailer marker system 10 is to be mounted to each of left and right side of trailer 100 of a truck. It can be seen how side markers 20 extend the length of trailer 100 while only one round marker 40 is found mounted at an end closer to the rear of trailer 100. It should be understood that trailer marker system 10 is not to be limited by materials nor by dimensions. It should be understood that a user may use a plurality of side markers 20 and round marker 40 depending on their needs which depend on the size and length of the vehicle onto which the present invention is mounted thereto. Trailer marker system 10 is not limited to including only one of side markers 20 and round marker 40 as shown is FIG. 1 and FIG. 2, that is simply for illustrative purposes.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A trailer marker system, comprising:
   a. a trailer;
   b. side markers mounted to said trailer, said side markers including a housing, a cover, a bulb socket, and light bulbs, said bulb socket is mounted to said housing, said light bulbs are inserted into said bulb socket, said cover roofs the housing adapted to protect the light bulbs, said cover further includes circular portions adapted to indicate how many of said light bulbs are housed within each of said side markers, wherein said housing further includes side marker floor cutouts having an arched cutout configuration;
   c. side marker floor light emitting diode (LED) lights mounted to the bottom of said cover of each of said side markers, said side marker floor LED lights having a cylindrical configuration that cooperates with said side marker floor cutouts, wherein said side marker floor LED lights are supported by said side marker floor cutouts when said cover is in a closed position, said side marker floor LED lights being exposed from said cutout adapted to illuminate a ground surface, said side marker floor LED lights positioned vertically when said housing is mounted on said trailer;

d. a round marker mounted to said trailer, said round marker including a round marker housing, a round marker cover, a round marker bulb socket and a rounder marker bulb, said round marker bulb socket is mounted to said round marker housing, said round marker bulb is inserted into said round marker bulb socket, said marker cover roofs the round marker housing adapted to protect the round marker bulb, said round marker housing further including a round marker floor cutout having an arched cutout configuration;

e. a round marker floor LED light mounted to the bottom of said round marker cover of said round marker, said round marker floor LED light having a cylindrical configuration that cooperates with said round marker floor cutout, wherein said round marker floor LED light is supported by said round marker floor cutout when said round marker cover is in a closed position, said round marker floor LED light being exposed from said round marker cutout adapted to illuminate a ground surface, said round marker floor LED light positioned vertically when said round marker housing is mounted on said trailer; and f. a wire adapted to interconnect each of said side markers and said round marker, said wire adapted to also interconnect said light bulbs and said round marker bulb, said wire further adapted to power each interconnected said light bulbs and said round marker bulb.

2. The trailer marker system of claim 1, wherein said side markers are elongated and rectangular shaped.

3. The trailer marker system of claim 1, wherein said round marker is circular shaped.

4. The trailer marker system of claim 1, wherein the number of said side marker floor light cutouts corresponds with the number of side marker floor LED lights.

5. The trailer marker system of claim 1, wherein the number of said round marker floor light cutout corresponds with the number of said round marker floor LED light.

6. The trailer marker system of claim 1, wherein said cover is made of plastic.

7. The trailer marker system of claim 1, wherein the number of said round marker floor LED light corresponds with the number of said round marker bulb.

8. The trailer marker system of claim 1, wherein the number of said side marker floor LED lights corresponds with the number of said light bulbs.

9. The trailer marker system of claim 1, wherein said side marker floor LED lights and said round marker floor LED light are white LED lights.

10. A trailer marker system, consisting of:

a. a truck vehicle having a trailer mounted to a rear end, wherein said trailer includes a sidewall, said sidewall including a bottom perimeter side having a first end and a second end;

b. four side marker assemblies mounted to said trailer, said four side marker assemblies positioned along said bottom perimeter side of said sidewall starting from said first end, each of said four side marker assemblies including a housing having a rectangular shape, said housing including a front end having two cutout portions with an arched cutout configuration, said housing further including a cover which cooperates with a top end of said housing, said cover including circular portions located on a top end, wherein said housing entirely encloses a bulb socket having two light bulbs mounted therein;

c. two side marker LED lights having a cylindrical shape which cooperates with said two cutout portions of said housing, said two side marker LED lights mounted to a bottom end of said cover, wherein said two side marker LED lights are supported by said two cutout portions when said cover encloses said housing, said two side marker LED lights being exposed from said two cutout portions and adapted to illuminate a ground surface, said two side marker LED lights positioned vertically when said housing is mounted to said trailer;

d. a single round marker assembly mounted to said second end of said bottom perimeter side of said sidewall, said single round marker assembly including a round marker housing having a circular shape, said round marker housing further including a round marker cover which cooperates with a top end of said round marker housing, said round marker cover further including a circular portion on a top end, wherein said round marker housing further includes a single cutout located on a front end, said single cutout having an arched configuration, wherein said round marker housing entirely encloses a single round marker bulb socket having a single round marker light bulb mounted thereon;

e. a single round marker LED light mounted to a bottom end of said round marker cover, said single round marker LED light having a cylindrical configuration which cooperates with said single cutout of said round marker housing, wherein said single round marker LED light is supported by said single cutout when said round marker cover encloses said round marker housing, wherein said single round marker LED light is exposed from said single cutout and adapted to illuminate a ground surface, said single round marker LED light positioned vertically when said round cover housing is mounted to said trailer; and f. a wiring communicably coupling said four side marker assemblies to said single round marker housing.

* * * * *